US012689034B2

(12) United States Patent

He et al.

(10) Patent No.: US 12,689,034 B2

(45) Date of Patent: Jul. 21, 2026

(54) NEGATIVE ACTIVE MATERIAL, ELECTROCHEMICAL DEVICE THAT USES SAME, AND ELECTRONIC DEVICE

(71) Applicant: Ningde Amperex Technology Limited, Fujian (CN)

(72) Inventors: Lihong He, Ningde (CN); Jia Tang, Ningde (CN); Jiali Dong, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 170 days.

(21) Appl. No.: 18/601,234

(22) Filed: Mar. 11, 2024

(65) Prior Publication Data

US 2024/0213474 A1 Jun. 27, 2024

Related U.S. Application Data

(63) Continuation of application No. 18/073,884, filed on Dec. 2, 2022, now Pat. No. 11,967,718, which is a (Continued)

(51) Int. Cl.
H01M 4/587 (2010.01)
C01B 32/20 (2017.01)
H01M 4/02 (2006.01)

(52) U.S. Cl.
CPC ............. H01M 4/587 (2013.01); C01B 32/20 (2017.08); *C01P 2002/74* (2013.01);

(Continued)

(58) Field of Classification Search
CPC .......... H01M 4/587; H01M 2004/021; H01M 2004/027; C01B 32/20; C01P 2002/74;

(Continued)

(56) References Cited

U.S. PATENT DOCUMENTS

2009/0042100 A1 2/2009 Tanaka et al.
2012/0021294 A1 1/2012 Zhamu et al.

(Continued)

FOREIGN PATENT DOCUMENTS

CN 1527795 A 9/2004
CN 101481109 A 7/2009

(Continued)

OTHER PUBLICATIONS

International Search Report issued on Jan. 27, 2021, in corresponding International Application No. PCT/CN2020/094385, 8 pages.

(Continued)

*Primary Examiner* — Cynthia K Walls
(74) *Attorney, Agent, or Firm* — Maier & Maier, PLLC

(57) ABSTRACT

A negative active material includes a carbon material. The carbon material satisfies the following relationship: 6.1<Gr/K≤15.3, Gr is a graphitization degree of the carbon material, measured by X-ray diffraction; and K is a ratio Id/Ig of a peak intensity Id of the carbon material at a wavenumber of 1250 cm$^{-1}$ to 1650 cm$^{-1}$ to a peak intensity Ig of the carbon material at a wavenumber of 1500 cm$^{-1}$ to 1650 cm$^{-1}$, and is measured by using Raman spectroscopy, and K is 0.09 to 0.15; and a Dv10 value and a Dv90 value of the negative active material in μm satisfy:

$$23.0 < Dv90/Dv10 + Dv90 \leq 50.$$

20 Claims, 5 Drawing Sheets

Related U.S. Application Data continuation of application No. PCT/CN2020/094385, filed on Jun. 4, 2020.

(52) U.S. Cl.
CPC ...... *C01P 2002/82* (2013.01); *C01P 2004/03* (2013.01); *C01P 2006/40* (2013.01); *H01M 2004/021* (2013.01); *H01M 2004/027* (2013.01)

(58) Field of Classification Search
CPC .............. C01P 2002/82; C01P 2004/03; C01P 2006/40
See application file for complete search history.

(56) References Cited

U.S. PATENT DOCUMENTS

| | | |
|---|---|---|
| 2013/0143127 A1 | 6/2013 | Nakamura et al. |
| 2018/0123120 A1 | 5/2018 | Lee et al. |
| 2021/0184205 A1 | 6/2021 | Choi et al. |

FOREIGN PATENT DOCUMENTS

| | | |
|---|---|---|
| CN | 102362381 A | 2/2012 |
| CN | 103078089 A | 5/2013 |
| CN | 104039697 A | 9/2014 |
| CN | 104364193 A | 2/2015 |
| CN | 104521038 A | 4/2015 |
| CN | 104838526 A | 8/2015 |
| CN | 108832075 A | 11/2018 |
| CN | 108847489 A | 11/2018 |
| CN | 109546204 A | 3/2019 |
| CN | 109553080 A | 4/2019 |
| CN | 109553085 A | 4/2019 |
| CN | 109616614 A | 4/2019 |
| CN | 109841831 A | 6/2019 |
| CN | 110870115 A | 3/2020 |
| CN | 112335080 B | 3/2022 |
| JP | 2014089887 A | 5/2014 |
| KR | 20180028797 A | 3/2018 |
| WO | 2014016907 A1 | 1/2014 |
| WO | 2020141953 A1 | 7/2020 |

OTHER PUBLICATIONS

Chinese Notification to Grant Patent Right for Invention and Search Report issued on Jan. 11, 2022, in corresponding application No. 202080003323.X, 7 pages.

Office Action issued on Feb. 21, 2023, in corresponding Japanese Application No. 2021-512516; 5 pages.

The extended European Search Report issued on Oct. 6, 2022 in corresponding Application No. 20938521, 6 pages.

Chinese Office Action issued on Nov. 1, 2021, in corresponding application No. 202080003323.X, 8 pages.

Indian Office Action issued on Jan. 27, 2023, in corresponding application No. 202117037695, 6 pages.

Chinese Office Action issued on Feb. 28, 2024, in corresponding application No. 202210287385.9, 12 pages.

Office Action issued on Sep. 25, 2023, in related U.S. Appl. No. 18/173,295, 20 pages.

Japanese Office Action issued on Sep. 13, 2022 in corresponding Application No. 2021-512516, 8 Pages.

Office Action issued on May 22, 2023, in related U.S. Appl. No. 18/073,884, 20 pages.

Office Action issued on May 24, 2023, in related U.S. Appl. No. 18/173,295, 20 pages.

European Office Action issued on Jul. 17, 2023, in corresponding application No. 20938521.0, 3 pages.

Office Action issued on Sep. 20, 2023 in related U.S. Appl. No. 18/073,884, 11 pages.

NEGATIVE ACTIVE MATERIAL, ELECTROCHEMICAL DEVICE THAT USES SAME, AND ELECTRONIC DEVICE

CROSS-REFERENCE TO RELATED APPLICATIONS

This application is a continuation application of U.S. application Ser. No. 18/073,884 filed on Dec. 2, 2022, which is a continuation application of International Patent Application No. PCT/CN2020/094385 filed on Jun. 4, 2020, the disclosures of which are hereby incorporated by reference in their entireties.

TECHNICAL FIELD

This application relates to the field of energy storage, and in particular, to a negative active material, an electrochemical device that uses same, and an electronic device.

BACKGROUND

Electrochemical devices (such as a lithium-ion battery) are widely used by virtue of advantages such as environmental friendliness, a high working voltage, a high specific capacity, and a long cycle life, and have become a more promising new green chemical power source in the world today. A small-sized lithium-ion battery is usually used as a power supply for a portable electronic communications device (for example, a portable camcorder, a mobile phone, or a notebook computer), especially a high-performance portable device. A medium-sized and large-sized lithium-ion battery having high output characteristics has been used in an electric vehicle (EV) and a large-scale energy storage system (ESS). As the wide application of the lithium-ion battery, a key technical issue to be solved urgently is that to increase an energy density, cycle performance, and rate performance of the battery. Improving an active material in an electrode plate is one of approaches to solving such issue.

In view of this, it is necessary to provide an improved negative active material, an electrochemical device that uses same, and an electronic device.

SUMMARY

Embodiments of this application provide a negative active material, an electrochemical device that uses same, and an electronic device to solve at least one problem in the related art to at least some extent.

According to an aspect of this application, this application provides a negative active material. The negative active material includes a carbon material. The carbon material satisfies the following relationship: 6<Gr/K<16, where, Gr is a graphitization degree of the carbon material, measured by means of X-ray diffraction. K is a ratio Id/Ig of a peak intensity Id of the carbon material at a wavenumber of 1250 cm$^{-1}$ to 1650 cm$^{-1}$ to a peak intensity Ig of the carbon material at a wavenumber of 1500 cm$^{-1}$ to 1650 cm$^{-1}$, and is measured by using Raman spectroscopy, and K is 0.06 to 0.15.

In some embodiments, the carbon material satisfies the following relationship: 8<Gr/K<15. In some embodiments, the carbon material satisfies the following relationship: 10<Gr/K<12. In some embodiments, a Gr/K ratio value of the carbon material is 6.5, 7, 7.5, 8, 8.5, 9, 9.5, 10, 10.5, 11, 11.5, 12, 12.5, 13, 13.5, 14, 14.5, 15, 15.5, or within a range formed by any two thereof.

In some embodiments, K of the carbon material is 0.08 to 0.10. In some embodiments, K of the carbon material is 0.06, 0.07, 0.08, 0.09, 0.10, 0.11, 0.12, 0.13, 0.14, 0.15, or within a range formed by any two thereof.

According to an embodiment of this application, the graphitization degree Gr of the carbon material is 0.92 to 0.96. In some embodiments, the graphitization degree Gr of the carbon material is 0.92, 0.93, 0.94, 0.95, 0.96, or within a range formed by any two thereof.

According to an embodiment of this application, the carbon material satisfies at least one of the following relationships:

$$Lc/S < 9;$$

$$La/S > 20,$$

where

La is a size of a crystal of the carbon material along a horizontal axis as measured by means of X-ray diffraction, and is measured in units of nm;

Lc is a size of a crystal of the carbon material along a vertical axis as measured by means of X-ray diffraction, and is measured in units of nm;

S is a ratio of a peak area C004 of a (004) surface to a peak area C110 of a (110) surface of the negative active material as measured by using an X-ray diffraction pattern; and Lc is less than 45, and La is greater than 50.

In some embodiments, Lc/S<8. In some embodiments, Lc/S<7. In some embodiments, Lc/S<6. In some embodiments, Lc/S>2. In some embodiments, Lc/S>3. In some embodiments, Lc/S is 3, 3.5, 4, 4.5, 5, 5.5, 6, 6.5, 7, 7.5, 8, 8.5, or within a range formed by any two thereof.

In some embodiments, La/S>22. In some embodiments, La/S>25. In some embodiments, La/S>28. In some embodiments, La/S>30. In some embodiments, La/S<60. In some embodiments, La/S<55. In some embodiments, La/S<50. In some embodiments, La/S is 22, 25, 28, 30, 35, 40, 45, 50, or within a range formed by any two thereof.

In some embodiments, Lc is less than 40. In some embodiments, Lc is less than 35. In some embodiments, Lc is less than 30. In some embodiments, Lc is less than 25. In some embodiments, Lc is greater than 10. In some embodiments, Lc is greater than 15. In some embodiments, Lc is greater than 20. In some embodiments, Lc is 20, 22, 25, 28, 30, 35, 40, 43, or within a range formed by any two thereof.

In some embodiments, La is greater than 60. In some embodiments, La is greater than 80. In some embodiments, La is greater than 100. In some embodiments, La is greater than 110. In some embodiments, La is greater than 120. In some embodiments, La is greater than 130. In some embodiments, La is greater than 150. In some embodiments, La is greater than 180. In some embodiments, La is greater than 200. In some embodiments, La is greater than 220. In some embodiments, La is less than 300. In some embodiments, La is less than 250. In some embodiments, Lc is 55, 60, 70, 80, 90, 100, 120, 150, 180, 200, 230, 250, or within a range formed by any two thereof.

According to an embodiment of this application, a Dv10 value and a Dv90 value of the negative active material satisfy the following relationship: Dv90/Dv10+Dv90>23.0. In some embodiments, the Dv10 value and the Dv90 value of the negative active material satisfy the following relationship: Dv90/Dv10+Dv90>25.0. In some embodiments, the Dv10 value and the Dv90 value of the negative active material satisfy the following relationship: Dv90/Dv10+Dv90>28.0. In some embodiments, the Dv10 value and the Dv90 value of the negative active material satisfy the following relationship: Dv90/Dv10+Dv90>30.0. In some embodiments, the Dv10 value and the Dv90 value of the negative active material satisfy the following relationship: Dv90/Dv10+Dv90<50.0. In some embodiments, the Dv10 value and the Dv90 value of the negative active material satisfy the following relationship: Dv90/Dv10+Dv90<45.0. In some embodiments, the Dv10 value and the Dv90 value of the negative active material satisfy the following relationship: Dv90/Dv10+Dv90<40.0. In some embodiments, the Dv10 value and the Dv90 value of the negative active material satisfy the following relationship: Dv90/Dv10+Dv90<35.0. In some embodiments, a value of (Dv90/Dv10+Dv90) of the negative active material is 24, 26, 28, 30, 33, 35, or within a range formed by any two thereof. In the foregoing relational expression, units of Dv90 and Dv10 are μm.

According to another aspect of this application, this application provides an electrochemical device, including a positive electrode, an electrolytic solution, and a negative electrode. The negative electrode includes a negative active material layer and a negative current collector. The negative active material layer includes the negative active material according to this application.

According to an embodiment of this application, an areal density of the negative active material layer is 0.077 mg/mm$^2$ to 0.121 mg/mm$^2$, and a compacted density of the negative active material layer is 1.70 g/cm$^3$ to 1.92 g/cm$^3$.

In some embodiments, the areal density of the negative active material layer is 0.080 mg/cm$^2$ to 0.120 mg/cm$^2$. In some embodiments, the areal density of the negative active material layer is 0.085 mg/cm$^2$ to 0.110 mg/cm$^2$. In some embodiments, the areal density of the negative active material layer is 0.090 mg/cm$^2$ to 0.100 mg/cm$^2$. In some embodiments, the areal density of the negative active material layer is 0.077 mg/mm$^2$, 0.080 mg/mm$^2$, 0.085 mg/mm$^2$, 0.090 mg/mm$^2$, 0.095 mg/mm$^2$, 0.100 mg/mm$^2$, 0.105 mg/mm$^2$, 0.110 mg/mm$^2$, 0.115 mg/mm$^2$, 0.120 mg/mm$^2$, 0.121 mg/mm$^2$, or within a range formed by any two thereof.

In some embodiments, a compacted density of the negative active material layer is 1.75 g/cm$^3$ to 1.90 g/cm$^3$. In some embodiments, a compacted density of the negative active material layer is 1.80 g/cm$^3$ to 1.85 g/cm$^3$. In some embodiments, the compacted density of the negative active material layer is 1.70 g/cm$^3$, 1.75 g/cm$^3$, 1.78 g/cm$^3$, 1.80 g/cm$^3$, 1.85 g/cm$^3$, 1.88 g/cm$^3$, 1.90 g/cm$^3$, 1.92 g/cm$^3$, or within a range formed by any two thereof.

According to an embodiment of this application, in a fully discharged state, as measured by using an X-ray diffraction pattern, a ratio S' of a peak area C004' of a (004) surface to a peak area C110' of a (110) surface of the negative active material layer is within a range of 10 to 20. In some embodiments, in a fully discharged state, as measured by using an X-ray diffraction pattern, S' of the negative active material layer is within a range of 12 to 18. In some embodiments, in a fully discharged state, as measured by using an X-ray diffraction pattern, S' of the negative active material layer is within a range of 14 to 16. In some embodiments, in a fully discharged state, as measured by using an X-ray diffraction pattern, S' of the negative active material layer is 10, 11, 12, 13, 14, 15, 16, 17, 18, 19, 20, or within a range formed by any two thereof.

According to an embodiment of this application, a peel-off strength between the negative active material layer and the negative current collector is 6 N/m to 15 N/m. In some embodiments, the peel-off strength between the negative active material layer and the negative current collector is 8 N/m to 14 N/m. In some embodiments, the peel-off strength between the negative active material layer and the negative current collector is 10 N/m to 12 N/m. In some embodiments, the peel-off strength between the negative active material layer and the negative current collector is 6 N/m, 7 N/m, 8 N/m, 9 N/m, 10 N/m, 11 N/m, 12 N/m, 13 N/m, 14 N/m, 15 N/m, or within a range formed by any two thereof.

According to an embodiment of this application, a porosity of the negative active material layer is 20% to 40%. In some embodiments, the porosity of the negative active material layer is 25% to 35%. In some embodiments, the porosity of the negative active material layer is 28% to 32%. In some embodiments, the porosity of the negative active material layer is 20%, 22%, 25%, 28%, 30%, 32%, 35%, 38%, 40%, or within a range formed by any two thereof.

According to an embodiment of this application, in a fully charged state of the electrochemical device, a thermal decomposition temperature of the negative active material layer is greater than or equal to 280° C. In some embodiments, in a fully charged state of the electrochemical device, a thermal decomposition temperature of the negative active material layer is greater than or equal to 300° C. In some embodiments, in a fully charged state of the electrochemical device, the thermal decomposition temperature of the negative active material layer is greater than or equal to 320° C. In some embodiments, in a fully charged state of the electrochemical device, the thermal decomposition temperature of the negative active material layer is greater than or equal to 340° C.

According to an embodiment of this application, in a fully discharged state of the electrochemical device, the thermal decomposition temperature of the negative active material layer is greater than or equal to 130° C. In some embodiments, in the fully discharged state of the electrochemical device, the thermal decomposition temperature of the negative active material layer is greater than or equal to 140° C. In some embodiments, in the fully discharged state of the electrochemical device, the thermal decomposition temperature of the negative active material layer is greater than or equal to 150° C. In some embodiments, in the fully discharged state of the electrochemical device, the thermal decomposition temperature of the negative active material layer is greater than or equal to 160° C.

According to an aspect of this application, this application provides an electronic device, including the electrochemical device according to this application.

Additional aspects and advantages of this application will be described or illustrated in part later herein or expounded through implementation of the embodiments of this application.

BRIEF DESCRIPTION OF DRAWINGS

For ease of describing the embodiments of this application, the following outlines the drawings necessary for describing the embodiments of this application. Apparently, the drawings outlined below are merely a part of embodiments in this application. Without making any creative efforts, a person skilled in the art can still obtain the drawings of other embodiments according to the structures illustrated in these drawings.

DETAILED DESCRIPTION

Figure 1:
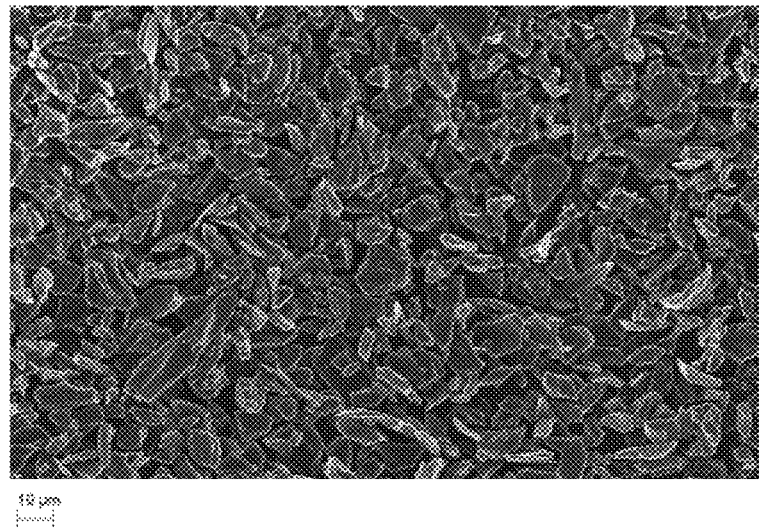
FIG. 1 shows a scanning electron microscope (SEM) image of a negative active material used in Comparative Embodiment 2 at a magnification of 500×.

Embodiments of this application will be described in detail below. In the specification of this application, identical or similar components and the components having identical or similar functions are represented by similar reference numerals. The embodiments described herein with reference to the accompanying drawings are illustrative and graphical in nature, and are intended to enable a basic understanding of this application. The embodiments of this application are not to be construed as a limitation on this application.

In the detailed description of embodiments and claims, a list of items referred to by using the terms such as "at least one of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

Wide application of electrochemical devices (such as a lithium-ion battery) is accompanied with higher requirements on performance of such devices. Energy density, cycle performance, and rate performance are important indicators of performance of lithium-ion batteries. So far, no effective means has been developed to simultaneously improve the energy density, cycle performance, and rate performance of the lithium-ion batteries.

This application solves such an issue by optimizing a negative active material. Specifically, this application provides a negative active material. The negative active material includes a carbon material. The carbon material satisfies the following relationship: 6<Gr/K<16, where, Gr is a graphitization degree of the carbon material, measured by means of X-ray diffraction. K is a ratio Id/Ig of a peak intensity Id of the carbon material at a wavenumber of 1250 $cm^{-1}$ to 1650 $cm^{-1}$ to a peak intensity Ig of the carbon material at a wavenumber of 1500 $cm^{-1}$ to 1650 $cm^{-1}$, and is measured by using Raman spectroscopy, and K is 0.06 to 0.15.

In some embodiments, the graphitization degree Gr and a K value of the carbon material satisfy the following relationship: 8<Gr/K<15. In some embodiments, the graphitization degree Gr and a K value of the carbon material satisfy the following relationship: 10<Gr/K<12. In some embodiments, a ratio Gr/K of the graphitization degree Gr to K of the carbon material is 6.5, 7, 7.5, 8, 8.5, 9, 9.5, 10, 10.5, 11, 11.5, 12, 12.5, 13, 13.5, 14, 14.5, 15, 15.5, or within a range formed by any two thereof.

In some embodiments, K of the carbon material is 0.08 to 0.10. In some embodiments, K of the carbon material is 0.06, 0.07, 0.08, 0.09, 0.10, 0.11, 0.12, 0.13, 0.14, 0.15, or within a range formed by any two thereof.

K of the carbon material may represent a ratio of a surface defect to a crystalline region of the material. K may be determined by using Raman spectroscopy: applying a 523 nm light source (at a shading intensity of 5%), picking 100 sample points in a 100 μm×100 μm region, calculating a ratio of a peak intensity Id of the carbon material at a wavenumber of 1250 $cm^{-1}$ to 1650 $cm^{-1}$ to a peak intensity Ig of the carbon material at a wavenumber of 1500 $cm^{-1}$ to 1650 $cm^{-1}$, and using an average value of the ratios as a K value of the carbon material.

"Graphitization degree" of the carbon material means a degree to which non-graphitic carbon is transformed into graphite-like carbon when the carbon material is put under a high temperature or put through secondary heating. The graphitization degree of the carbon material may be measured in the following method: using high-purity silicon powder as an internal standard substance for calibration, testing an interplanar spacing (d002) of a 002 surface of the carbon material by means of X-ray diffraction, and calculating the graphitization degree Gr of the carbon material according to the following formula: Gr=(0.344−d002)/0.086.

The graphitization degree and the K value of the carbon material in the negative active material affect insertion and extraction of lithium ions. For example, in a discharging process of a lithium-ion battery, lithium ions move to a negative electrode. The negative electrode receives the lithium ions. The graphitization degree and the K value of the carbon material affect a speed at which the lithium ions are inserted into particles of the carbon material. When the lithium-ion battery is discharged at a high C-rate, if the lithium ions are unable to be quickly inserted into the particles of the carbon material or diffused inside the particles, the lithium ions will precipitate on a surface, thereby accelerating cycle attenuation of the lithium-ion battery. In a charging process of the lithium-ion battery, the lithium ions are extracted from a negative electrode. If the lithium ions are unable to be quickly extracted from the negative electrode, the lithium ions will generate dead lithium inside the particles of the carbon material, also accelerating the cycle attenuation of the lithium-ion battery. The graphitization degree and the K value of the carbon material will also affect a thickness of a solid electrolyte interface (SEI) film formed during a first cycle of the lithium-ion battery, thereby affecting first-cycle coulombic efficiency of the lithium-ion battery and thus affecting an energy density of the lithium-ion battery.

When the carbon material has a high graphitization degree (for example, Gr>0.96), the interplanar spacing of the carbon material decreases, thereby adversely affecting extraction of the lithium ions from the carbon material. When the carbon material has a relatively low graphitization degree (for example, Gr<0.92), a relatively large quantity of $SP^3$ bonds exist in the carbon material. In this way, layers of the carbon material restrain each other, and a structure of the carbon material is more stable.

When falling within the foregoing range, the graphitization degree Gr of the carbon material and the ratio Gr/K of the graphitization degree to K of the carbon material significantly improve the energy density, the cycle performance, and the rate performance of the lithium-ion battery.

According to an embodiment of this application, the graphitization degree Gr of the carbon material is 0.92 to 0.96. In some embodiments, the graphitization degree Gr of the carbon material is 0.92, 0.93, 0.94, 0.95, 0.96, or within a range formed by any two thereof. When falling in the foregoing range, the graphitization degree of the carbon material helps to further improve the energy density, the cycle performance, and the rate performance the lithium-ion battery.

According to an embodiment of this application, the carbon material satisfies at least one of the following relationships:

$$Lc/S < 9;$$

$$La/S > 20,$$

where

La is a size of a crystal of the carbon material along a horizontal axis as measured by means of X-ray diffraction, and is measured in units of nm;

Lc is a size of a crystal of the carbon material along a vertical axis as measured by means of X-ray diffraction, and is measured in units of nm;

S is a ratio of a peak area C004 of a (004) surface to a peak area C110 of a (110) surface of the negative active material as measured by using an X-ray diffraction pattern; and Lc is less than 45, and La is greater than 50.

In some embodiments, Lc/S<8. In some embodiments, Lc/S<7. In some embodiments, Lc/S<6. In some embodiments, Lc/S>2. In some embodiments, Lc/S>3. In some embodiments, Lc/S is 3, 3.5, 4, 4.5, 5, 5.5, 6, 6.5, 7, 7.5, 8, 8.5, or within a range formed by any two thereof.

In some embodiments, La/S>22. In some embodiments, La/S>25. In some embodiments, La/S>28. In some embodiments, La/S>30. In some embodiments, La/S<60. In some embodiments, La/S<55. In some embodiments, La/S<50. In some embodiments, La/S is 22, 25, 28, 30, 35, 40, 45, 50, or within a range formed by any two thereof.

In some embodiments, Lc is less than 40. In some embodiments, Lc is less than 35. In some embodiments, Lc is less than 30. In some embodiments, Lc is less than 25. In some embodiments, Lc is greater than 10. In some embodiments, Lc is greater than 15. In some embodiments, Lc is greater than 20. In some embodiments, Lc is 20, 22, 25, 28, 30, 35, 40, 43, or within a range formed by any two thereof.

In some embodiments, La is greater than 60. In some embodiments, La is greater than 80. In some embodiments, La is greater than 100. In some embodiments, La is greater than 110. In some embodiments, La is greater than 120. In some embodiments, La is greater than 130. In some embodiments, La is greater than 150. In some embodiments, La is greater than 180. In some embodiments, La is greater than 200. In some embodiments, La is greater than 220. In some embodiments, La is less than 300. In some embodiments, La is less than 250. In some embodiments, Lc is 55, 60, 70, 80, 90, 100, 120, 150, 180, 200, 230, 250, or within a range formed by any two thereof.

The size of the crystal of the carbon material affects the insertion and extraction of the lithium ions during cycles. According to an X-ray diffraction pattern, a ratio S of a peak area C004 of a (004) surface to a peak area C110 of a (110) surface of the negative active material represents a degree of orientation of the negative active material. The larger the S value, the more anisotropic the negative active material. The smaller the S value, the more isotropic the negative active material. When falling in the foregoing range, the size of the crystal of the carbon material and the ratio of the size of the crystal to the degree of orientation of the carbon material help to further improve the energy density, the cycle performance, and the rate performance the lithium-ion battery.

According to an embodiment of this application, a Dv10 value and a Dv90 value of the negative active material satisfy the following relationship: Dv90/Dv10+Dv90>23.0, and units of Dv90 and Dv10 are µm. "Dv90" represents a particle size of the negative active material at a cumulative volume of 90% in the volume-based particle size distribution as measured by starting from small particle sizes, that is, a particle size measured when a volume of particles of the negative active material that are smaller than the particle size accounts for 90% of a total volume of the negative active material. "Dv10" represents a particle size of the negative active material at a cumulative volume of 10% in the volume-based particle size distribution as measured by starting from small particle sizes, that is, a particle size measured when a volume of particles of the negative active material that are smaller than the particle size accounts for 10% of the total volume of the negative active material. The particle size of the negative active material may be measured by using a particle size analyzer (such as a Malvern particle size analyzer).

In some embodiments, the Dv10 value and the Dv90 value of the negative active material satisfy the following relationship: Dv90/Dv10+Dv90>25.0. In some embodiments, the Dv10 value and the Dv90 value of the negative active material satisfy the following relationship: Dv90/Dv10+Dv90>28.0. In some embodiments, the Dv10 value and the Dv90 value of the negative active material satisfy the following relationship: Dv90/Dv10+Dv90>30.0. In some embodiments, the Dv10 value and the Dv90 value of the negative active material satisfy the following relationship: Dv90/Dv10+Dv90<50.0. In some embodiments, the Dv10 value and the Dv90 value of the negative active material satisfy the following relationship: Dv90/Dv10+Dv90<45.0. In some embodiments, the Dv10 value and the Dv90 value of the negative active material satisfy the following relationship: Dv90/Dv10+Dv90<40.0. In some embodiments, the Dv10 value and the Dv90 value of the negative active material satisfy the following relationship: Dv90/Dv10+Dv90<35.0. In some embodiments, a (Dv90/Dv10+Dv90) value of the negative active material is 24, 26, 28, 30, 33, 35, or within a range formed by any two thereof. In the foregoing relational expression, units of Dv90 and Dv10 are µm.

When the particle size of the negative active material is larger, a specific surface area of the negative active material is smaller. Therefore, by consuming merely a small quantity of lithium ions during a first cycle, the lithium-ion battery can form a solid electrolyte interface (SEI) film with an electrolytic solution, thereby enhancing first-cycle coulombic efficiency of the lithium-ion battery. Larger particle sizes also prolong a path of insertion and extraction of the lithium ions, thereby reducing kinetic performance of the lithium-ion battery. In addition, larger particle sizes adversely affect cycle expansion of the lithium-ion battery. Conversely, when the particle size of the negative active material is smaller, the specific surface area of the negative active material is larger. Therefore, the lithium-ion battery needs to consume a large quantity of lithium ions to form the SEI film with the electrolytic solution during a first cycle, thereby reducing the first-cycle coulombic efficiency of the lithium-ion battery. Smaller particle sizes also shorten the path of insertion and extraction of the lithium ions, thereby affecting the kinetic performance of the lithium-ion battery. In addition, smaller particle sizes adversely affect the cycle expansion of the lithium-ion battery. When satisfying the foregoing relationship, Dv90 and Dv10 of the negative active material help to balance various performance indicators of the lithium-ion battery and further improve the energy density, the cycle performance, and the rate performance the lithium-ion battery.

This application further provides an electrochemical device, including a positive electrode, a negative electrode, a separator, and an electrolytic solution. The following describes the positive electrode, the negative electrode, the separator, and the electrolytic solution that are applicable to this application.

Negative Electrode

A negative electrode applicable to an electrochemical device according to this application includes a negative current collector and a negative active material layer. The negative active material layer includes a negative active material according to this application.

According to an embodiment of this application, an areal density of the negative active material layer is 0.077 $mg/mm^2$ to 0.121 $mg/mm^2$, and a compacted density of the negative active material layer is 1.70 $g/cm^3$ to 1.92 $g/cm^3$.

In some embodiments, the areal density of the negative active material layer is 0.080 $mg/cm^2$ to 0.120 $mg/cm^2$. In some embodiments, the areal density of the negative active material layer is 0.085 $mg/cm^2$ to 0.110 $mg/cm^2$. In some embodiments, the areal density of the negative active material layer is 0.090 $mg/cm^2$ to 0.100 $mg/cm^2$. In some embodiments, the areal density of the negative active material layer is 0.077 $mg/mm^2$, 0.080 $mg/mm^2$, 0.085 $mg/mm^2$, 0.090 $mg/mm^2$, 0.095 $mg/mm^2$, 0.100 $mg/mm^2$, 0.105 $mg/mm^2$, 0.110 $mg/mm^2$, 0.115 $mg/mm^2$, 0.120 $mg/mm^2$, 0.121 $mg/mm^2$, or within a range formed by any two thereof. The areal density of the negative active material layer may be obtained by using the following test method: discharging the battery to 0% state of charge (SOC), disassembling the battery, washing and drying the battery, and weighing a piece of negative electrode by using an electronic balance (both sides of the negative current collector are coated with the negative active material layer), where the area of the piece of negative electrode is denoted as A and the weight is denoted as $W_1$; washing off the negative active material layer by using a solvent; and drying and measuring the weight of the negative current collector, denoted as $W_2$; and calculating the areal density of the negative active material layer according to the following formula: areal density= $(W_1-W_2)/(A\times2)$.

In some embodiments, a compacted density of the negative active material layer is 1.75 $g/cm^3$ to 1.90 $g/cm^3$. In some embodiments, a compacted density of the negative active material layer is 1.80 $g/cm^3$ to 1.85 $g/cm^3$. In some embodiments, the compacted density of the negative active material layer is 1.70 $g/cm^3$, 1.75 $g/cm^3$, 1.78 $g/cm^3$, 1.80 $g/cm^3$, 1.85 $g/cm^3$, 1.88 $g/cm^3$, 1.90 $g/cm^3$, 1.92 $g/cm^3$, or within a range formed by any two thereof. The compacted density of the negative active material layer may be obtained by using the following test method: discharging the battery to 0% SOC, disassembling the battery, washing and drying the battery, and weighing a piece of negative electrode by using an electronic balance (both sides of the negative current collector are coated with the negative active material layer), where the area of the piece of negative electrode is denoted as A and the weight is denoted as $W_1$; and measuring a thickness $T_1$ of the negative electrode by using a micrometer; washing off the negative active material layer by using a solvent, drying the negative current collector, measuring the weight of the negative current collector, denoted as $W_2$, and measuring the thickness of the negative current collector by using a micrometer, denoted as $T_2$; and calculating the weight $W_0$ and the thickness $T_0$ of the negative active material layer located on a side of the negative current collector, and the compacted density of the negative active material layer according to the following formula:

$$W_0 = (W_1 - W_2)/2$$

$$T_0 = (T_1 - T_2)/2$$

$$\text{Compacted density} = W_0/(T_0 \times A).$$

According to an embodiment of this application, in a fully discharged state, as measured by an X-ray diffraction pattern, a ratio S' of a peak area C004' of a (004) surface to a peak area C110' of a (110) surface of the negative active material layer is within a range of 10 to 20. In some embodiments, in a fully discharged state, as measured by an X-ray diffraction pattern, S' of the negative active material layer is within a range of 12 to 18. In some embodiments, in a fully discharged state, as measured by an X-ray diffraction pattern, S' of the negative active material layer is within a range of 14 to 16. In some embodiments, in a fully discharged state, as measured by an X-ray diffraction pattern, S' of the negative active material layer is 10, 11, 12, 13, 14, 15, 16, 17, 18, 19, 20, or within a range formed by any two thereof. S' may represent the degree of orientation of the negative active material layer. The larger the S' value, the more anisotropic the negative active material layer. The smaller the S' value, the more isotropic the negative active material layer.

According to an embodiment of this application, a peel-off strength between the negative active material layer and the negative current collector is 6 N/m to 15 N/m. In some embodiments, the peel-off strength between the negative active material layer and the negative current collector is 8 N/m to 14 N/m. In some embodiments, the peel-off strength between the negative active material layer and the negative current collector is 10 N/m to 12 N/m. In some embodiments, the peel-off strength between the negative active material layer and the negative current collector is 6 N/m, 7 N/m, 8 N/m, 9 N/m, 10 N/m, 11 N/m, 12 N/m, 13 N/m, 14 N/m, 15 N/m, or within a range formed by any two thereof. The peel-off strength between the negative active material layer and the negative current collector may be obtained by performing a tensile test. The test method is: testing bonding between the negative active material layer and the negative current collector by using an Instron tester (model: 33652), specifically, taking a 15 to 20 mm length of a negative electrode, fixing the piece of negative electrode onto a steel sheet by using a 3M double-sided tape, and sticking the tape on the surface of the negative active material layer, where one end of the double-sided tape is connected to a paper tape whose width is equal to that of the double-sided tape; adjusting a stopper of a tensile tester to an appropriate position, folding the paper tape upward, and sliding the paper tape for 40 mm at a sliding speed of 50 mm/min; and testing (that is, pulling the material in an opposite direction) the peel-off strength between the negative active material layer and the negative current collector at a temperature of 180°.

According to an embodiment of this application, a porosity of the negative active material layer is 20% to 40%. In some embodiments, the porosity of the negative active material layer is 25% to 35%. In some embodiments, the porosity of the negative active material layer is 28% to 32%. In some embodiments, the porosity of the negative active material layer is 20%, 22%, 25%, 28%, 30%, 32%, 35%, 38%, 40%, or within a range formed by any two thereof. The porosity of the negative active material layer may be obtained according to the standard of *Iron ores—Determination of Apparent Density, True Density And Porosity*, GB/T24586-2009.

When the areal density of the negative active material layer is constant, decrease of the compacted density of the negative active material layer reduces the anisotropy and porosity of the negative active material layer, and reduces the peel-off strength between the negative active material layer and the negative current collector. When the compacted density of the negative active material layer is constant, decrease of the areal density of the negative active material layer increases the anisotropy of the negative active material layer, reduces the porosity of the negative active material layer, and reduces the peel-off strength between the negative active material layer and the negative current collector. When falling in the foregoing ranges, the areal density, the compacted density, and the porosity of the negative active material layer and/or the peel-off strength between the negative active material layer and the negative current collector help to further improve the energy density, the cycle performance, and the rate performance the lithium-ion battery.

According to an embodiment of this application, in a fully charged state of the electrochemical device, a thermal decomposition temperature of the negative active material layer is greater than or equal to 280° C. In some embodiments, in a fully charged state of the electrochemical device, a thermal decomposition temperature of the negative active material layer is greater than or equal to 300° C. In some embodiments, in a fully charged state of the electrochemical device, the thermal decomposition temperature of the negative active material layer is greater than or equal to 320° C. In some embodiments, in a fully charged state of the electrochemical device, the thermal decomposition temperature of the negative active material layer is greater than or equal to 340° C. When the electrochemical device is in a fully charged state, the lithium ions are inserted into vacancies of the negative active material. At this time, a thermal decomposition temperature of the negative active material layer can represent a high-temperature aging degree of the negative electrode. To be specific, the higher the decomposition temperature of the negative active material, the lower the the high-temperature aging degree, and the higher the high-temperature cycle performance of the lithium-ion battery.

According to an embodiment of this application, in a fully discharged state of the electrochemical device, the thermal decomposition temperature of the negative active material layer is greater than or equal to 130° C. In some embodiments, in the fully discharged state of the electrochemical device, the thermal decomposition temperature of the negative active material layer is greater than or equal to 140° C. In some embodiments, in the fully discharged state of the electrochemical device, the thermal decomposition temperature of the negative active material layer is greater than or equal to 150° C. In some embodiments, in the fully discharged state of the electrochemical device, the thermal decomposition temperature of the negative active material layer is greater than or equal to 160° C. When the electrochemical device is in a fully discharged state, all lithium ions are extracted from the negative electrode. The thermal decomposition temperature of the negative active material layer can indirectly represent stability of the SEI film. To be specific, the higher the decomposition temperature of the negative active material, the higher the thermal stability of the SEI film, the fewer the lithium ions needed to repair the SEI film during cycles of the lithium ion battery, and the higher the cycle performance of the lithium-ion battery.

The thermal decomposition temperature of the negative active material layer may be measured by using differential scanning calorimetry (DSC). Specifically, the thermal decomposition temperature of the negative active material layer to be tested is measured by using a differential scanning calorimeter when the negative active material layer is heated at 0° C. to 800° C. at a constant heating rate.

The negative current collector used in this application may be selected from a copper foil, a nickel foil, a stainless steel foil, a titanium foil, foamed nickel, foamed copper, a polymer substrate coated with a conductive metal, or any combination thereof.

According to an embodiment of this application, the negative electrode further includes a conductive layer. In some implementation solutions, a conductive material of the conductive layer may include any conductive material that does not cause a chemical change. Examples of the conductive material include but are not limited to: a carbon-based material (for example, natural graphite, artificial graphite, carbon black, acetylene black, Ketjen black, carbon fiber, carbon nanotubes, and graphene), a metal-based material (for example, metal powder, metal fiber, including copper, nickel, aluminum, silver, and the like), a conductive polymer (for example, a polyphenylene derivative), or any mixture thereof.

According to an embodiment of this application, the negative electrode further includes a binder. The binder is selected from at least one of the following: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, or the like.

Positive Electrode

The positive electrode includes a positive current collector and a positive active material disposed on the positive current collector. Specific types of the positive active material are not limited, and may be selected according to needs.

In some implementation solutions, the positive active material includes a positive electrode material capable of absorbing and releasing lithium (Li). Examples of the positive active material capable of absorbing or releasing lithium (Li) may include lithium cobalt oxide, lithium nickel cobalt manganese oxide, lithium nickel cobalt aluminum oxide, lithium manganese oxide, lithium iron manganese phosphate, lithium vanadium phosphate, lithium vanadyl phosphate, lithium iron phosphate, lithium titanium oxide, and a lithium-rich manganese-based materials.

Specifically, the chemical formula of the lithium cobalt oxide may be chemical formula 1:

$$Li_xCo_aM1_bO_{2-c} \hspace{2cm} \text{chemical formula 1}$$

where M1 is at least one selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and values of x, a, b, and c are in the following ranges: $0.8 \leq x \leq 1.2$, $0.8 \leq a \leq 1$, $0 \leq b \leq 0.2$, $-0.1 \leq c \leq 0.2$, respectively.

The chemical formula of lithium nickel cobalt manganese oxide or lithium nickel cobalt aluminum oxide may be chemical formula 2:

$$Li_yNi_dM2_eO_{2-f} \hspace{2cm} \text{chemical formula 2}$$

where, M2 is at least one selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and values of y, d, e, and f are in the following ranges: $0.8 \leq y \leq 1.2$, $0.3 \leq d \leq 0.98$, $0.02 \leq e \leq 0.7$, $-0.1 \leq f \leq 0.2$, respectively.

The chemical formula of the lithium manganese oxide may be chemical formula 3:

$$Li_zMn_{2-g}M3_gO_{4-h} \hspace{2cm} \text{chemical formula 3}$$

where, M3 is at least one selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and values of z, g, and h are in the following ranges: $0.8 \leq z \leq 1.2$, $0 \leq g \leq 1.0$, and $-0.2 \leq h \leq 0.2$, respectively.

In some embodiments, the weight of the positive active material layer is 1.5 to 15 times the weight of the negative active material layer. In some embodiments, the weight of the positive active material layer is 3 to 10 times the weight of the negative active material layer. In some embodiments, the weight of the positive active material layer is 5 to 8 times the weight of the negative active material layer. In some embodiments, the weight of the positive active material layer is 1.5 times, 2 times, 3 times, 4 times, 5 times, 6 times, 7 times, 8 times, 9 times, 10 times, 11 times, 12 times, 13 times, 14 times, or 15 times the weight of the negative active material layer.

In some embodiments, the positive active material layer may have a coating on its surface, or may be mixed with another compound having a coating. The coating may include at least one compound of a coating element, which is selected from: an oxide of a coating element, a hydroxide of a coating element, an oxyhydroxide of a coating element, an oxycarbonate of a coating element, and a hydroxycarbonate of a coating element. The compound used for the coating may be amorphous or crystalline. The coating element included in the coating may include Mg, Al, Co, K, Na, Ca, Si, Ti, V, Sn, Ge, Ga, B, As, Zr, or F, or a mixture thereof. The coating may be applied in any method as long as the method does not adversely affect performance of the positive active material. For example, the method may include any coating method well known to a person of ordinary skill in the art, such as spraying and infiltrating.

In some embodiments, the positive active material layer further includes a binder, and optionally, further includes a positive electrode conductive material.

The binder improves bonding between particles of the positive active material and bonding between the positive active material and the current collector. Examples of the binder include but are not limited to: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

The positive active material layer includes a positive electrode conductive material, thereby making the electrode electrically conductive. The positive electrode conductive material may include any conductive material that does not cause a chemical change. Examples of the positive electrode conductive material include but are not limited to: a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), or any mixture thereof.

The positive current collector used for the electrochemical device according to this application may be, but is not limited to, aluminum (Al).

Electrolytic Solution

The electrolytic solution applicable to the embodiments of this application may be an electrolytic solution known in the prior art.

The electrolyte applicable to the electrolytic solution according to the embodiments of this application may be but is not limited to: inorganic lithium salt, for example, $LiClO_4$, $LiAsF_6$, $LiPF_6$, $LiBF_4$, $LiSbF_6$, $LiSO_3F$, and $LiN(FSO_2)_2$; fluorine-containing organic lithium salt, for example, $LiCF_3SO_3$, $LiN(FSO_2)(CF_3SO_2)$, $LiN(CF_3SO_2)_2$, $LiN(C_2FsSO_2)_2$, cyclic 1,3-hexafluoropropane disulfonimide lithium, cyclic 1,2-tetrafluoroethane disulfonimide lithium, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and lithium salt containing a dicarboxylic acid coordination complex, for example, lithium bis(oxalate) borate, lithium difluoro(oxalate) borate, lithium tris(oxalate) phosphate, lithium difluorobis(oxalate) phosphate, and lithium tetrafluoro(oxalate) phosphate. In addition, a single one of the foregoing electrolytes may be used separately, or two or more thereof may be used simultaneously. In some embodiments, the electrolyte includes a combination of $LiPF_6$ and $LiBF_4$. In some embodiments, the electrolyte includes a combination of an inorganic lithium salt such as $LiPF_6$ or $LiBF_4$ and a fluorine-containing organic lithium salt such as $LiCF_3SO_3$, $LiN(CF_3SO_2)_2$, and $LiN(C_2F_5SO_2)_2$. In some embodiments, the electrolyte includes $LiPF_6$.

In some embodiments, a concentration of the electrolyte is within a range of 0.8 mol/L to 3 mol/L, for example, within a range of 0.8 mol/L to 2.5 mol/L, within a range of 0.8 mol/L to 2 mol/L, within a range of 1 mol/L to 2 mol/L, or, for another example, the concentration of the electrolyte is 1 mol/L, 1.15 mol/L, 1.2 mol/L, 1.5 mol/L, 2 mol/L, or 2.5 mol/L.

Solvents applicable to the electrolytic solution according to the embodiments of this application include, but are not limited to, cyclic carbonate, chain carbonate, cyclic carboxylate, chain carboxylate, cyclic ether, or chain ether.

In some embodiments, the cyclic carbonate includes, but is not limited to, ethylene carbonate (ethylene carbonate, EC), propylene carbonate (propylene carbonate, PC), and butylene carbonate.

In some embodiments, the cyclic carbonate contains 3 to 6 carbon atoms.

In some embodiments, the chain carbonate includes, but is not limited to: chain carbonate such as dimethyl carbonate, ethyl methyl carbonate, diethyl carbonate (DEC), methyl n-propyl carbonate, ethyl n-propyl carbonate, and di-n-propyl carbonate; and fluorine-substituted chain carbonate, such as bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trifluoroethyl methyl carbonate.

In some embodiments, the cyclic carboxylate includes but is not limited to gamma-butyrolactone and gamma-valerolactone. In some embodiments, a part of hydrogen atoms of the cyclic carboxylate may be substituted by fluorine.

In some embodiments, the chain carboxylate includes, but is not limited to, methyl acetate, ethyl acetate, propyl acetate, isopropyl acetate, butyl acetate, see-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, a part of hydrogen atoms of the chain carboxylate may be substituted by fluorine. In some embodiments, the fluorine-substituted chain carboxylate includes, but is not limited to, methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes, but is not limited to, tetrahydrofuran, 2-methyl tetrahydrofuran, 1,3-dioxolane, 2-methyl1,3-dioxolane, 4-methyl 1,3-dioxolane, 1,3-dioxane, 1,4-dioxane, and dimethoxypropane.

In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the solvent used in the electrolytic solution according to this application includes one or more of the foregoing. In some embodiments, the solvent used in the electrolytic solution according to this application includes cyclic carbonate, chain carbonate, cyclic carboxylate, chain carboxylate, and any combination thereof. In some embodiments, the solvent used in the electrolytic solution according to this application includes an organic solvent selected from groups consisting of: ethylene carbonate, propylene carbonate, diethyl carbonate, ethyl propionate, propyl propionate, n-propyl acetate, ethyl acetate, and any combination thereof. In some embodiments, the solvent used in the electrolytic solution according to this application includes: ethylene carbonate, propylene carbonate, diethyl carbonate, ethyl propionate, propyl propionate, gamma-butyrolactone, or any combination thereof.

Additives applicable to the electrolytic solution according to the embodiments of this application include, but are not limited to, cyclic carbonate containing a carbon-carbon double bond, and a compound containing a sulfur-oxygen double bond.

In some embodiments, the cyclic carbonate containing a carbon-carbon double bond specifically includes, but is not limited to at least one of: vinylene carbonate, methyl vinylene carbonate, ethyl vinylene carbonate, vinyl ethylene carbonate, or 1,2-dimethyl vinylene carbonate.

In some embodiments, the compound containing a sulfur-oxygen double bond includes, but is not limited to at least one of: vinyl sulfate, 1,2-propylene glycol sulfate, 1,3-propane sultone, 1-fluoro-1,3-propane sultone, 2-fluoro-1,3-propane sultone, or 3-fluoro-1,3-propane sultone.

Separator

In some implementation solutions, a separator is disposed between the positive electrode and the negative electrode to prevent a short circuit. The material and the shape of the separator applicable to the embodiments of this application are not particularly limited, and may be based on any technology disclosed in the prior art. In some implementation solutions, the separator includes a polymer or an inorganic compound or the like formed from a material that is stable to the electrolytic solution according to this application.

For example, the separator may include a substrate layer and a surface treatment layer. The substrate layer is a non-woven fabric, film or composite film, which, in each case, have a porous structure. The material of the substrate layer is selected from at least one of polyethylene, polypropylene, polyethylene terephthalate, and polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film. The porous structure can improve heat resistance, oxidation resistance, and electrolyte infiltration performance of the separator, and enhance adhesivity between the separator and the electrode plate.

A surface treatment layer is disposed on at least one surface of the substrate layer. The surface treatment layer may be a polymer layer or an inorganic compound layer, or a layer formed by mixing a polymer and an inorganic compound.

The inorganic compound layer includes inorganic particles and a binder. The inorganic particles are selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate. The binder is selected from a combination of one or more of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, and a polyhexafluoropropylene.

The polymer layer includes a polymer, and the material of the polymer is selected from at least one of a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

Electrochemical Device

This application further provides an electrochemical device, including a positive electrode, an electrolytic solution, and a negative electrode. The positive electrode includes a positive active material layer and a positive current collector. The negative electrode includes a negative active material layer and a negative current collector. The negative active material layer includes the negative active material according to this application.

The electrochemical device according this application includes any device in which an electrochemical reaction occurs. Specific examples of the device include all kinds of primary batteries, secondary batteries, fuel batteries, solar batteries, or capacitors. In particular, the electrochemical device is a lithium secondary battery, including a lithium metal secondary battery, a lithium-ion secondary battery, a lithium polymer secondary battery, or a lithium-ion polymer secondary battery.

Electronic Device

Another aspect of this application provides an electronic device, including the electrochemical device according to this application.

The electrochemical device according to this application may be used for purposes not particularly limited, and may be used for any electronic device known in the prior art. In some implementation solutions, the electrochemical device according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes preparation of a lithium-ion battery as an example with reference to specific embodiments. A person skilled in the art understands that the preparation method described in this application are merely examples. Any other appropriate preparation methods fall within the scope of this application.

Embodiments

The following describes performance evaluation of the lithium-ion batteries according to the embodiments and comparative embodiments of this application.

I. Preparing a Lithium-Ion Battery

1. Preparing a Negative Electrode

The method for preparing a negative electrode includes: pulverizing artificial graphite, sieving the artificial graphite hierarchically to control a particle size distribution, so as to make Dv90 be less than 25 μm and obtain primary particles; adding a binder into the primary particles to bond the particles, and sieving the particles hierarchically to control the particle size, so as to make Dv90 be less than 45 μm and obtain secondary particles; graphitizing the primary particles and the secondary particles at 2300° C. to 3500° C., and then sieving the graphitized primary particles and secondary particles in a mixed manner to obtain a graphite negative electrode material; and mixing the prepared graphite as a negative electrode material, an additive, styrene butadiene rubber (SBR) as a binder, and sodium carboxymethyl cellulose (CMC) as a thickener at a mass ratio of 97:1.5:1.5; and fully stirring and mixing the mixture in an appropriate amount of deionized water to form a homogeneous non-settling negative slurry; and coating the negative current collector (copper foil) with the negative slurry, performing drying and cold calendering to obtain a negative active material layer, and then performing cutting and slitting to obtain a negative electrode.

The graphitization degree and the K value of the graphite material in the negative electrode may be controlled by controlling a raw material, a particle size, a graphitization temperature, and a mixing ratio of primary particles to secondary particles.

2. Preparing a Positive Electrode

The method for preparing a positive electrode includes: mixing lithium cobalt oxide ($Li_xCO_aM1_bO_{2-c}$, where x, a, b, and c fall within the following ranges: $0.8 \le x \le 1.2$, $0.8 \le a \le 1$, $0 \le b \le 0.2$, $-0.1 \le c \le 0.2$; M1 is manganese (Mn), magnesium (Mg), aluminum (Al), boron (B), titanium (Ti), vanadium (V), chromium (Cr), iron (Fe), copper (Cu), zinc (Zn)), molybdenum (Mo), or any combination thereof), acetylene black, and vinylidene difluoride (PVDF) at a mass ratio of 95:2:3; and fully stirring and mixing the mixture in an appropriate amount of N-methyl pyrrolidone (NMP) solvent to form homogeneous positive slurry; and coating a positive current collector aluminum foil with the slurry, performing drying and cold calendering to obtain a positive active material layer, and then performing cutting and slitting to obtain a positive electrode.

3. Preparing an Electrolytic Solution

The method for preparing an electrolytic solution includes: mixing ethylene carbonate (EC), propylene carbonate (PC), and diethyl carbonate (DEC) in a dry argon atmosphere glovebox at a mass ratio of 1:1:1, adding 2 wt % fluoroethylene carbonate, 2 wt % 1,3-propane sultone, and 2 wt % succinonitrile, dissolving and fully stirring the mixture, and then adding lithium salt $LiPF_6$, and mixing the mixture evenly to obtain an electrolytic solution, in which a concentration of $LiPF_6$ is 1 mol/L.

4. Preparing a Separator

A polyethylene (PE) porous polymer film serves as a separator.

5. Preparing a Lithium-Ion Battery

The method for preparing a lithium-ion battery includes: stacking the positive electrode, the separator, and the negative electrode sequentially, placing the separator between positive electrode and the negative electrode to serve a separation function, and winding them to obtain a bare cell; welding tabs and then putting the bare cell into an outer package made of an aluminum laminated film foil, and injecting the prepared electrolytic solution into the dried bare cell, and performing steps such as vacuum packaging, standing, chemical formation, reshaping, and capacity test to obtain a lithium-ion battery.

II. Test Methods

1. Method for Determining the K Value of the Carbon Material

The K value of the carbon material may be determined according to Raman spectroscopy, and the method includes: applying a 523 nm light source (at a shading intensity of 5%), picking 100 sample points in a 100 μm×100 μm region, calculating a ratio of a peak intensity Id of the carbon material at a wavenumber of 1250 cm$^{-1}$ to 1650 cm$^{-1}$ to a peak intensity Ig of the carbon material at a wavenumber of 1500 cm$^{-1}$ to 1650 cm$^{-1}$, and using an average value of the ratios as a K value of the carbon material.

2. Method for Determining the Graphitization Degree of the Carbon Material

The method for determining the graphitization degree of the carbon material includes: using high-purity silicon powder (purity ≥99.99%) as an internal standard substance for calibration, mixing the carbon material and silicon at a mass ratio of 5:1, grinding the mixture evenly, and pressing the mixture into tablet samples; measuring an interplanar spacing (d002) of a 002 surface of the carbon material by using an X-ray diffractometer (using Cu Kα as a target material), and calculating the graphitization degree Gr of the carbon material according to the following formula:

$$Gr=(0.344-d002)/0.086.$$

3. Method for Determining the Degree of Orientation S of the Negative Active Material and the Degree of Orientation S' of the Negative Active Material Layer A (004) surface diffraction line pattern and a (110) surface diffraction line pattern in X-ray diffraction patterns of the negative active material and the negative active material layer are determined according to *Determination Method of Artificial Graphite Lattice Parameters*, JB/T 4220-2011, a machinery industry standard of the People's Republic of China. Test conditions are as follows: the X-ray adopts CuKα radiation, and the CuKα radiation is removed by a filter or a monochromator. A working voltage of an X-ray tube is 35 kV to 45 kV, and a working current is 30 mA to 50 mA. A scanning speed of a counter is 0.3 (°)/min. In recording the diffraction line pattern of the (004) surface, a scanning range of a diffraction angle 2θ is 52° to 58°. In recording the diffraction line pattern of the (110) surface, the scanning range of the diffraction angle 2θ is 70° to 79°.

A peak area of the negative active material obtained from the diffraction line pattern of the (004) surface is denoted as C004. A peak area of the negative active material obtained from the diffraction line pattern of the (110) surface is denoted as C110. A ratio of C004 to C110 of the negative active material is calculated, and denoted as S.

A peak area of the negative active material layer obtained from the diffraction line pattern of the (004) surface is denoted as C004'. A peak area of the negative active material layer obtained from the diffraction line pattern of the (110) surface is denoted as C110'. A ratio of C004' to C110' of the negative active material is calculated, and denoted as S'.

4. Method for Measuring the Size of the Crystal of the Carbon Material

The size La of the crystal of the carbon material along a horizontal axis and the size Lc of the crystal of the carbon material along a vertical axis in the negative active material are analyzed and measured by using an X-ray diffractometer.

5. Method for Measuring the Particle Size of the Negative Active Material

The particle size of the negative active material is measured by using a Malvern particle size analyzer, and the method includes: dispersing the negative active material in an ethanol dispersant, ultrasonicating the material for 30 minutes to make a sample, adding the sample into the Malvern particle size analyzer, and measuring Dv90 and Dv10 of the negative active material.

6. Method for Determining the Areal Density of the Negative Active Material Layer The method for determining the areal density includes: discharging the battery to 0% state of charge (SOC), disassembling the battery, washing and drying the battery, and weighing a piece of negative electrode by using an electronic balance (both sides of the negative current collector are coated with the negative active material layer), where the area of the piece of negative electrode is denoted as A and the weight is denoted as $W_1$; washing off the negative active material layer by using a solvent; and drying and measuring the weight of the negative current collector, denoted as $W_2$; and calculating the areal density of the negative active material layer according to the following formula: areal density=$(W_1-W_2)/(A\times2)$.

7. Method for Determining the Compacted Density of the Negative Active Material Layer The method for determining the compacted density includes: discharging the battery to 0% SOC, disassembling the battery, washing and drying the battery, and weighing a piece of negative electrode by using an electronic balance (both sides of the negative current collector are coated with the negative active material layer), where the area of the piece of negative electrode is denoted as A and the weight is denoted as $W_1$; and measuring a thickness $T_1$ of the negative electrode by using a micrometer; washing off the negative active material layer by using a solvent, drying the negative current collector, measuring the weight of the negative current collector, denoted as $W_2$, and measuring the thickness of the negative current collector by using a micrometer, denoted as $T_2$; and calculating the weight $W_0$ and the thickness $T_0$ of the negative active material layer located on a side of the negative current collector, and the compacted density of the negative active material layer according to the following formula:

$$W_0 = (W_1 - W_2)/2$$

$$T_0 = (T_1 - T_2)/2$$

$$\text{Compacted density} = W_0/(T_0 \times A).$$

8. Method for Determining the Peel-Off Strength Between the Negative Active Material Layer and the Negative Current Collector The method for determining the peel-off strength includes: testing bonding between the negative active material layer and the negative current collector by using an Instron tension tester (model: 33652), specifically, taking a 15 mm to 20 mm length of a negative electrode, fixing the piece of negative electrode onto a steel sheet by using a 3M double-sided tape, and sticking the tape on the surface of the negative active material layer, where one end of the double-sided tape is connected to a paper tape whose width is equal to that of the double-sided tape; adjusting a stopper of a tensile tester to an appropriate position, folding the paper tape upward, and sliding the paper tape for 40 mm at a sliding speed of 50 mm/min; and testing (that is, pulling the material in an opposite direction) the peel-off strength between the negative active material layer and the negative current collector at a temperature of 180°.

9. Method for Determining the Porosity of the Negative Active Material Layer

Samples of the negative active material layer are made into complete wafers. For each embodiment or comparative embodiment, 30 samples are tested, and the size of each sample is approximately 0.35 cm$^3$. The porosity of the negative active material layer is determined according to the standard of *Iron ores-Determination of Apparent Density, True Density And Porosity*, GB/T24586-2009.

10. Method for Determining Infiltration Time of the Negative Active Material Layer The method for determining the infiltration time includes: adding 1 mL of electrolytic solution dropwise onto the negative active material layer and starting time counting. Time counting stops when the electrolytic solution on the surface of the negative active material layer fully disappears. 100 values of counted time are obtained for each embodiment or comparative embodiment, and an average of the values is used as the infiltration time of the negative active material layer.

11. Method for Determining the Thermal Decomposition Temperature of the Negative Active Material Layer The thermal decomposition temperature of the negative active material layer disassembled in a fully charged state or a fully discharged state is measured by using a differential scanning calorimeter when the negative active material layer is heated at 0° C. to 800° C. at a constant heating rate.

12. Method for Determining the Cycle Capacity Retention Rate of the Lithium-Ion Battery The determining method includes: leaving the lithium-ion battery to stand for 10 minutes at a temperature of 45° C., charging the battery at a constant current of 0.7 C until the voltage reaches 4.4 V, discharging the battery at a constant voltage of 4.4 V until the current reaches 0.05 C, and leaving the battery to stand for 10 minutes; charging the battery at a constant current of 0.7 C until the voltage reaches 3.0 V, and leaving the battery to stand for 10 minutes so that a cycle is completed; recording a discharge capacity after the first cycle; repeating the foregoing steps to complete 400 cycles, and recording a discharge capacity after the cycles; calculating the cycle capacity retention rate of the lithium-ion battery according to the following formula:

$$\text{cycle capacity retention rate} = (\text{discharge capacity after the cycles/discharge capacity after the first cycle}) \times 100\%; \text{ and}$$

testing the cycle capacity retention rate of the lithium-ion battery at 25° C. by performing basically identical steps except that the working temperature is 25° C. and the quantity of cycles is 800.

13. Method for Determining the Cycle Expansion Rate of the Lithium-Ion Battery

The determining method includes: leaving the lithium-ion battery to stand for 10 minutes at a temperature of 45° C., charging the battery at a constant current of 0.7 C until the voltage reaches 4.4 V, discharging the battery at a constant voltage of 4.4 V until the current reaches 0.05 C, and leaving the battery to stand for 10 minutes; charging the battery at a constant current of 0.7 C until the voltage reaches 3.0 V, and leaving the battery to stand for 10 minutes so that a cycle is completed; recording a thickness of the lithium-ion battery after the first cycle; repeating the foregoing steps to complete 400 cycles, and recording a thickness of the lithium-ion battery after the cycles; calculating the cycle expansion rate of the lithium-ion battery according to the following formula:

$$\text{cycle expansion rate} = (\text{thickness after the cycles/thickness after the first cycle}) \times 100\%; \text{ and}$$

testing the cycle expansion rate of the lithium-ion battery at 25° C. by performing basically identical steps except that the working temperature is 25° C. and the quantity of cycles is 800.

14. Method for Testing Lithium Plating of the Lithium-Ion Battery

The method includes: discharging the lithium-ion battery at a constant current of 0.5 C and at a temperature of 25° C. until the voltage reaches 3.0 V, and leaving the battery to stand for 10 minutes; charging the battery at a constant current of 1.5 C until the voltage reaches 4.1 V, charging the battery at a constant voltage of 4.1 V until the current reaches 0.05 C, charging the battery at a constant current of 0.7 C until the voltage reaches 4.3 V, charging the battery at a constant voltage of 4.3 V until the current reaches 0.05 C, charging the battery at a constant current of 0.5 C until the voltage reaches 4.4 V, charging the battery at a constant voltage of 4.4 V until the current reaches 0.05 C, and finally, discharging the battery at a constant current of 0.5 C until the voltage reaches 3.0 V, and leaving the battery to stand for 10 minutes; repeating the foregoing charge and discharge processes for 10 cycles; disassembling the battery under dry conditions, taking photos to record the status of the negative electrode; and determining a lithium plating degree of the lithium-ion battery according to the following criteria:

when the negative electrode of the disassembled battery exhibits a golden yellow color as a whole, gray is seen in very few positions of the negative electrode, and the area of the gray region accounts for less than 2%, it is determined that no lithium plating occurs.

When the negative electrode of the disassembled battery mostly exhibits a golden yellow color, gray is seen in some positions of the negative electrode, and the area of the gray region accounts for 2% to 20%, it is determined that slight lithium plating occurs.

When the negative electrode of the disassembled battery exhibits a gray color as a whole, golden yellow is seen in some positions of the negative electrode, and the area of the gray region accounts for 20% to 60%, it is determined that lithium plating occurs.

When the negative electrode of the disassembled battery exhibits a gray color as a whole, and the area of the gray region accounts for more than 60%, it is determined that severe lithium plating occurs.

III. Test Results

Table 1 shows how the characteristics of the negative active material affects the performance of the lithium-ion battery.

Figure 4:
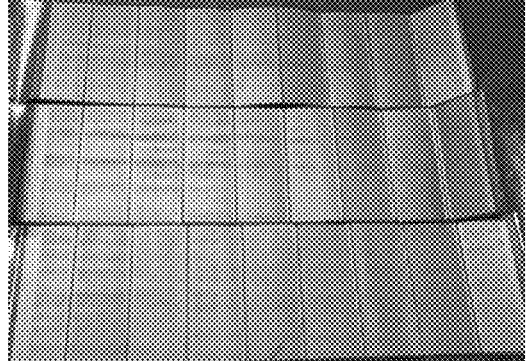
FIG. 4 shows a photograph of an exterior of the negative active material used in Comparative Embodiment 1 in which lithium plating occurs after cycling.
Figure 5:
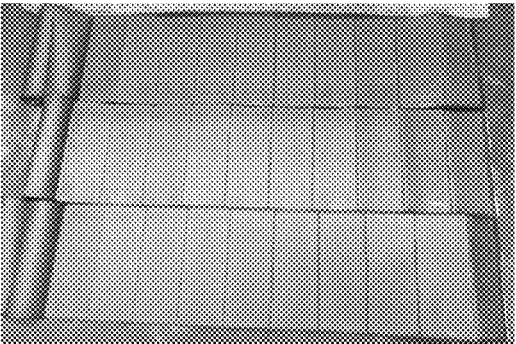
FIG. 5 shows a photograph of an exterior of the negative active material used in Comparative Embodiment 2 in which severe lithium plating occurs after cycling.

As shown in Comparative Embodiment 1, when the ratio Gr/K of the graphitization degree Gr to K of the negative active material is less than 6 and K is greater than 0.15, the first-cycle coulombic efficiency of the lithium-ion battery is very low, the lithium plating occurs (as shown in FIG. 4), the cycle capacity retention rate is relatively low, and the cycle expansion rate is high. As shown in Comparative Embodiment 2, when the ratio Gr/K of the graphitization degree Gr to K of the negative active material is greater than 16 and K is less than 0.06, the first-cycle coulombic efficiency of the lithium-ion battery is relatively low, severe lithium plating occurs (as shown in FIG. 5), the cycle capacity retention rate is very low, and the cycle expansion rate is very high.

Figure 3:
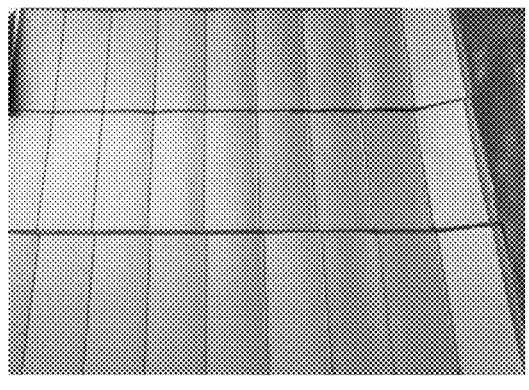
FIG. 3 shows a photograph of an exterior of the negative active material used in Embodiment 5 in which no lithium plating occurs after cycling.

As shown in Embodiments 1 to 36, when the ratio Gr/K of the graphitization degree Gr to K of the negative active material falls within a range of 6 to 16 and K is within a range of 0.06 to 0.15, the first-cycle coulombic efficiency and the cycle capacity retention rate of the lithium-ion battery can be significantly increased, the cycle expansion rate of lithium-ion battery can be significantly reduced, and the lithium plating of the lithium-ion battery during cycles can be significantly suppressed (as shown in FIG. 3). The significant improvement of the first-cycle coulombic efficiency indicates a significantly increased energy density of the lithium-ion battery. The significant increase of the cycle capacity retention rate and the significant decrease of the cycle expansion rate indicate significantly improved cycle performance of the lithium-ion battery. The suppression of the lithium plating helps to significantly improve the rate performance of lithium-ion battery. Therefore, the energy density, the cycle performance, and the rate performance of the lithium-ion batteries in Embodiments 1 to 36 are significantly improved.

When the graphitization degree Gr of the negative active material falls within the range of 0.92 to 0.96, overall performance of the lithium-ion battery is more excellent.

When the size of the crystal of the carbon material in the negative active material and the degree of orientation of the negative active material satisfy the following relationship: $Lc/S<9$, $La/S>20$, $Lc<45$, and $La>50$, the first-cycle coulombic efficiency and the cycle capacity retention rate of the lithium-ion battery improved, the cycle expansion rate and/or the lithium plating of the lithium-ion battery are further suppressed, and the overall performance of the lithium-ion battery is further improved.

The (Dv90/Dv10+Dv90) value greater than 23.0 helps to further improve the cycle capacity retention rate and suppresses the lithium plating of the lithium-ion battery and enhance the overall performance of lithium-ion battery.

Figure 2:
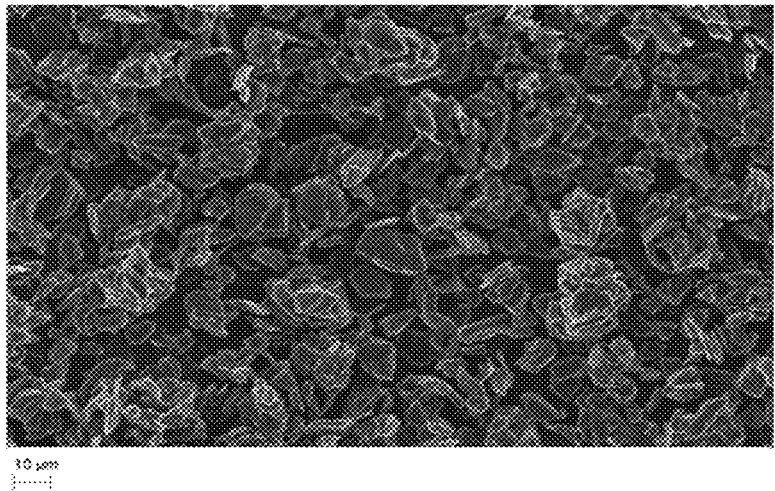
FIG. 2 shows a scanning electron microscope (SEM) image of a negative active material used in Embodiment 5 at a magnification of 500×.

FIG. 1 shows a scanning electron microscope (SEM) image of a negative active material used in Comparative Embodiment 2 at a magnification of 500×. As shown in FIG. 1, the negative active material in Comparative Embodiment 2 includes merely primary particles. FIG. 2 shows a scanning electron microscope (SEM) image of a negative active material used in Embodiment 5 at a magnification of 500×. As shown in FIG. 2, the negative active material in Embodiment 5 includes primary particles and secondary particles that each account for a percentage, and the graphitization degree and the K value of the carbon material can be adjusted by adjusting the percentage.

Figure 6:
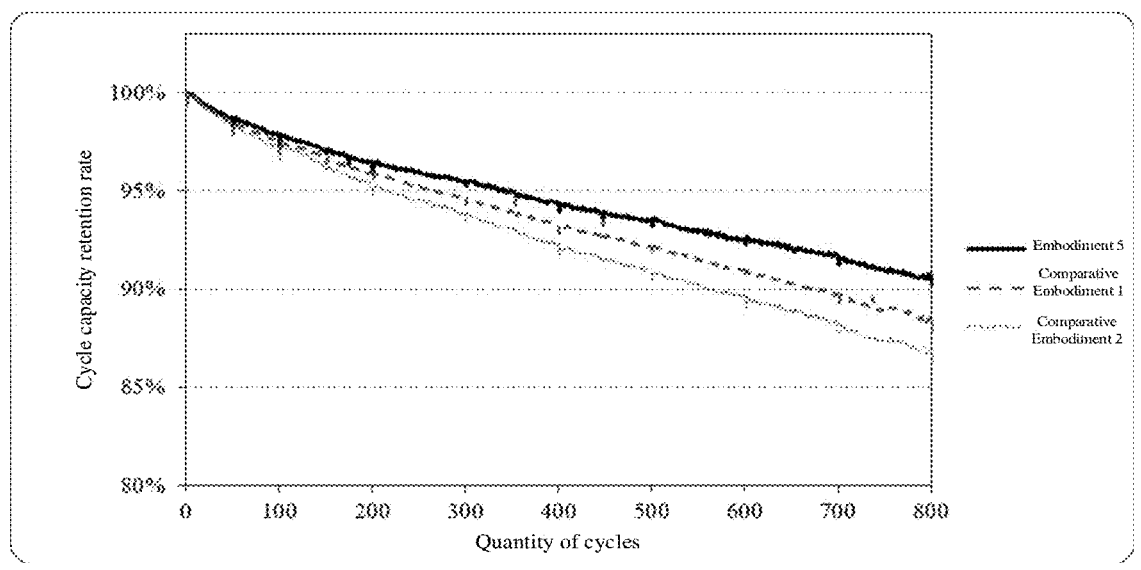
FIG. 6 shows a curve of a cycle capacity retention rate of lithium-ion batteries disclosed in Comparative Embodiment 1, Comparative Embodiment 2, and Embodiment 5 and put through a quantity of cycles at 25° C.
Figure 7:
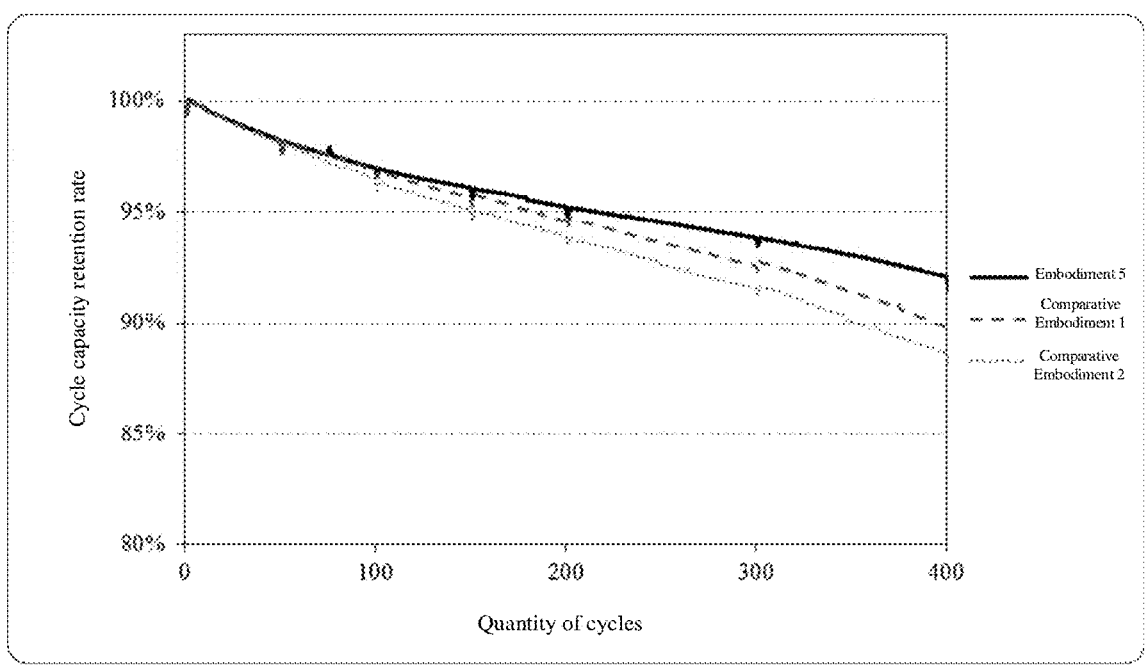
FIG. 7 shows a curve of a cycle capacity retention rate of lithium-ion batteries disclosed in Comparative Embodiment 1, Comparative Embodiment 2, and Embodiment 5 and put through a quantity of cycles at 45° C.
Figure 8:
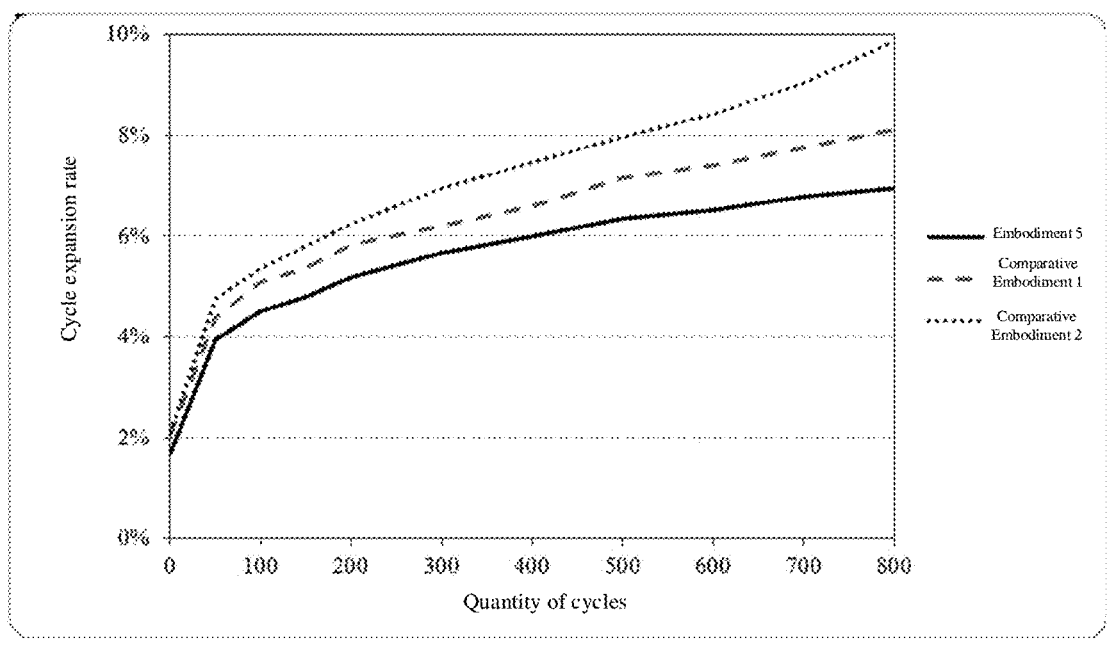
FIG. 8 shows a curve of an expansion rate of lithium-ion batteries disclosed in Comparative Embodiment 1, Comparative Embodiment 2, and Embodiment 5 and put through a quantity of cycles at 25° C.
Figure 9:
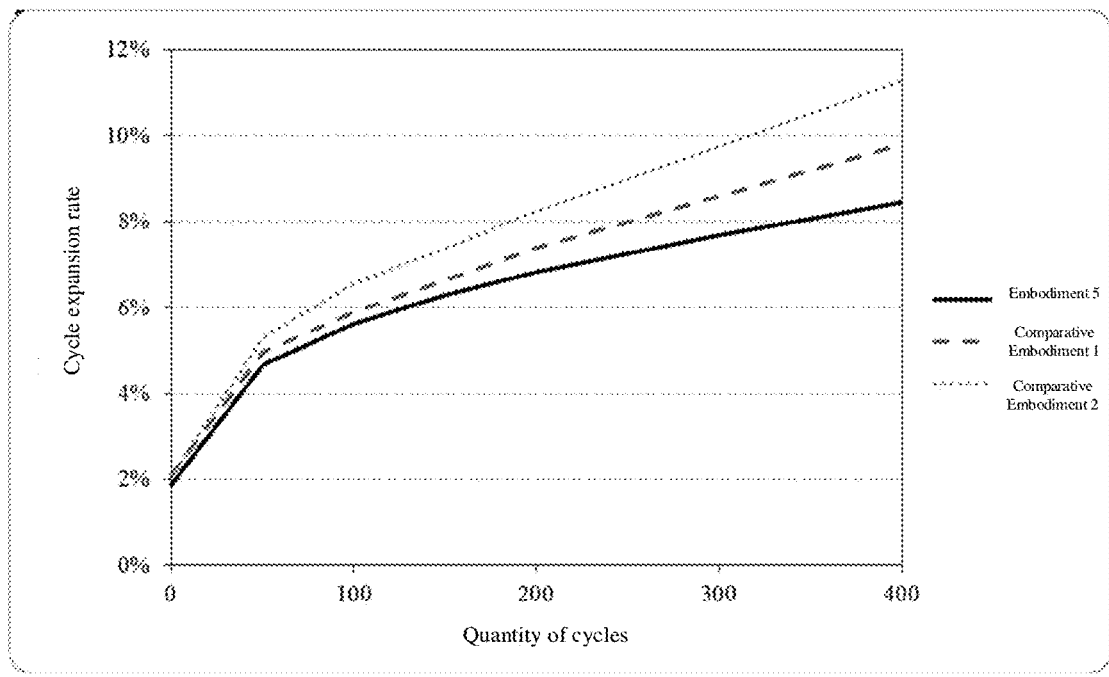
FIG. 9 shows a curve of an expansion rate of lithium-ion batteries disclosed in Comparative Embodiment 1, Comparative Embodiment 2, and Embodiment 5 and put through a quantity of cycles at 45° C.

FIG. 6 shows a curve of a cycle capacity retention rate of lithium-ion batteries disclosed in Comparative Embodiment 1, Comparative Embodiment 2, and Embodiment 5 and put through a quantity of cycles at 25° C. FIG. 7 shows a curve of a cycle capacity retention rate of lithium-ion batteries disclosed in Comparative Embodiment 1, Comparative Embodiment 2, and Embodiment 5 and put through a quantity of cycles at 45° C. The results show that, in contrast with Comparative Embodiments 1 and 2, the cycle capacity retention rate of the lithium-ion battery in Embodiment 5 under 25° C. and 45° C. always remains above 90%. As the quantity of cycles increases, the cycle capacity retention rate differs more sharply between Embodiment 5 and Comparative Embodiments 1 and 2. FIG. 8 shows a curve of an expansion rate of lithium-ion batteries disclosed in Comparative Embodiment 1, Comparative Embodiment 2, and Embodiment 5 and put through a quantity of cycles at 25° C. FIG. 9 shows a curve of an expansion rate of lithium-ion batteries disclosed in Comparative Embodiment 1, Comparative Embodiment 2, and Embodiment 5 and put through a quantity of cycles at 45° C. The results show that, in contrast with Comparative Embodiments 1 and 2, the cycle expansion rate of the lithium-ion battery in Embodiment 5 under 25° C. is always less than 8%, and the cycle expansion rate under 45° C. is always less than 10%. As the quantity of cycles increases, the cycle expansion rate differs more sharply between Embodiment 5 and Comparative Embodiments 1 and 2. The foregoing results indicate that the cycle performance of the lithium-ion battery in Embodiment 5 is significantly improved during cycles at both a room temperature and a high temperature.

Table 2 shows how the characteristics of the negative active material layer affects the performance of the lithium-ion battery. Embodiments 37 to 44 are improvements made based on Embodiment 5 shown in Table 1, and differ from Embodiment 5 only in the parameters listed in Table 2.

The results show that, when the areal density of the negative active material layer is constant, the overall performance of the battery may be further affected by the compacted density of the negative active material layer, the anisotropy (S' is decreased) and porosity of the negative active material layer, and the peel-off strength between the negative active material layer and the negative current collector. The first-cycle coulombic efficiency and the cycle capacity retention rate are further improved, the cycle expansion rate and/or the lithium plating of the lithium-ion battery are further suppressed, and the overall performance of the lithium-ion battery is further enhanced when the parameters satisfy the following conditions: the areal density of the negative active material layer is 0.077 $mg/mm^2$ to 0.121 $mg/mm^2$, the compacted density is 1.70 $g/cm^3$ to 1.92 $g/cm^3$, S' of the lithium-ion battery in the fully discharged state is 10 to 20, the peel-off strength between the negative active material layer and the negative current collector is 6 N/m to 15 N/m, the porosity of the negative active material layer is 20% to 40%, the thermal decomposition temperature of the negative active material layer in the fully charged state is not less than 280° C., and/or the thermal decomposition temperature of the negative active material layer in the fully discharged state is greater than or equal to 130° C. When the compacted density of the negative active material layer is constant, the lithium-ion battery whose areal density of the negative active material layer is 0.100 $mg/mm^2$ exhibits relatively high overall performance.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

TABLE 1

| | Gr/K | K | Gr | Lc/S | La/S | Lc | La | Dv90 | Dv90/ Dv10 + Dv90 | First-cycle coulombic efficiency | Lithium plating phenomenon | Cycle capacity retention rate | Cycle expansion rate |
|---|---|---|---|---|---|---|---|---|---|---|---|---|---|
| Embodiment 1 | 9.2 | 0.10 | 0.923 | 5.8 | 25.2 | 26.6 | 115.4 | 28.5 | 38.0 | 92.7% | No lithium plating | 92.7% | 8.2% |
| Embodiment 2 | 9.6 | 0.10 | 0.955 | 5.8 | 25.2 | 26.6 | 115.4 | 28.5 | 38.0 | 93.6% | No lithium plating | 92.0% | 8.7% |
| Embodiment 3 | 6.3 | 0.15 | 0.940 | 5.8 | 25.2 | 26.6 | 115.4 | 28.5 | 38.0 | 92.6% | No lithium plating | 91.5% | 8.1% |
| Embodiment 4 | 7.2 | 0.13 | 0.940 | 5.8 | 25.2 | 26.6 | 115.4 | 28.5 | 38.0 | 93.0% | No lithium plating | 92.1% | 8.2% |
| Embodiment 5 | 9.4 | 0.10 | 0.940 | 5.8 | 25.2 | 26.6 | 115.4 | 28.5 | 38.0 | 93.4% | No lithium plating | 92.5% | 8.2% |
| Embodiment 6 | 13.4 | 0.07 | 0.940 | 5.8 | 25.2 | 26.6 | 115.4 | 28.5 | 38.0 | 93.6% | No lithium plating | 92.1% | 8.6% |
| Embodiment 7 | 6.6 | 0.14 | 0.920 | 5.8 | 25.2 | 26.6 | 115.4 | 28.5 | 38.0 | 91.4% | No lithium plating | 90.5% | 8.2% |
| Embodiment 8 | 7.7 | 0.12 | 0.925 | 5.8 | 25.2 | 26.6 | 115.4 | 28.5 | 38.0 | 92.5% | No lithium plating | 91.5% | 8.2% |
| Embodiment 9 | 8.5 | 0.11 | 0.935 | 5.8 | 25.2 | 26.6 | 115.4 | 28.5 | 38.0 | 93.0% | No lithium plating | 91.5% | 8.4% |
| Embodiment 10 | 10.6 | 0.09 | 0.950 | 5.8 | 25.2 | 26.6 | 115.4 | 28.5 | 38.0 | 93.2% | No lithium plating | 92.5% | 8.8% |
| Embodiment 11 | 12.0 | 0.08 | 0.960 | 5.8 | 25.2 | 26.6 | 115.4 | 28.5 | 38.0 | 93.7% | No lithium plating | 92.7% | 9.0% |
| Embodiment 12 | 14.0 | 0.07 | 0.950 | 5.8 | 25.2 | 26.6 | 115.4 | 28.5 | 38.0 | 93.4% | No lithium plating | 91.5% | 8.9% |
| Embodiment 13 | 15.9 | 0.06 | 0.956 | 5.8 | 25.2 | 26.6 | 115.4 | 28.5 | 38.0 | 94.2% | Slight lithium plating | 90.2% | 9.7% |
| Embodiment 14 | 6.1 | 0.15 | 0.920 | 5.8 | 25.2 | 26.6 | 115.4 | 28.5 | 38.0 | 91.0% | No lithium plating | 90.5% | 8.2% |
| Embodiment 15 | 6.4 | 0.15 | 0.960 | 5.8 | 25.2 | 26.6 | 115.4 | 28.5 | 38.0 | 92.5% | No lithium plating | 90.3% | 9.1% |
| Embodiment 16 | 15.3 | 0.06 | 0.920 | 5.8 | 25.2 | 26.6 | 115.4 | 28.5 | 38.0 | 92.4% | No lithium plating | 91.5% | 9.0% |
| Embodiment 17 | 9.1 | 0.10 | 0.910 | 5.8 | 25.2 | 26.6 | 115.4 | 28.5 | 38.0 | 91.4% | No lithium plating | 91.3% | 9.1% |
| Embodiment 18 | 7.0 | 0.13 | 0.910 | 5.8 | 25.2 | 26.6 | 115.4 | 28.5 | 38.0 | 91.0% | No lithium plating | 91.0% | 9.2% |
| Embodiment 19 | 9.7 | 0.10 | 0.970 | 5.8 | 25.2 | 26.6 | 115.4 | 28.5 | 38.0 | 91.0% | Slight lithium plating | 90.1% | 9.1% |
| Embodiment 20 | 9.4 | 0.10 | 0.940 | 8.9 | 33.8 | 26.7 | 101.4 | 28.5 | 38.0 | 91.3% | Slight lithium plating | 91.9% | 8.6% |
| Embodiment 21 | 9.4 | 0.10 | 0.940 | 8.5 | 33.5 | 25.5 | 100.5 | 28.5 | 38.0 | 91.7% | No lithium plating | 92.0% | 8.2% |
| Embodiment 22 | 9.4 | 0.10 | 0.940 | 7.1 | 31.8 | 22.0 | 98.6 | 28.5 | 38.0 | 92.7% | No lithium plating | 92.3% | 8.2% |
| Embodiment 23 | 9.4 | 0.10 | 0.940 | 6.5 | 29.1 | 22.8 | 101.9 | 28.5 | 38.0 | 93.0% | No lithium plating | 92.1% | 8.3% |
| Embodiment 24 | 9.4 | 0.10 | 0.940 | 4.7 | 21.8 | 26.4 | 122.5 | 28.5 | 38.0 | 92.9% | No lithium plating | 91.9% | 8.5% |
| Embodiment 25 | 9.4 | 0.10 | 0.940 | 4.3 | 21.2 | 41.2 | 166.4 | 28.5 | 38.0 | 92.6% | Slight lithium plating | 91.2% | 8.8% |
| Embodiment 26 | 9.4 | 0.10 | 0.940 | 7.0 | 18.0 | 21.4 | 55.0 | 28.5 | 38.0 | 91.0% | No lithium plating | 92.0% | 8.6% |
| Embodiment 27 | 9.4 | 0.10 | 0.940 | 10.1 | 24.3 | 43.0 | 95.0 | 28.5 | 38.0 | 91.5% | No lithium plating | 90.7% | 9.1% |
| Embodiment 28 | 9.4 | 0.10 | 0.940 | 12.0 | 19.0 | 48.0 | 76.0 | 28.5 | 38.0 | 91.1% | Slight lithium plating | 90.6% | 9.3% |
| Embodiment 29 | 9.4 | 0.10 | 0.940 | 20.0 | 17.0 | 40.0 | 45.0 | 28.5 | 38.0 | 90.4% | No lithium plating | 90.2% | 8.8% |
| Embodiment 30 | 9.4 | 0.10 | 0.940 | 5.8 | 25.2 | 26.6 | 115.4 | 28.5 | 43.0 | 93.0% | No lithium plating | 92.3% | 8.3% |
| Embodiment 31 | 9.4 | 0.10 | 0.940 | 5.8 | 25.2 | 26.6 | 115.4 | 28.5 | 50.0 | 92.5% | No lithium plating | 91.9% | 8.6% |
| Embodiment 32 | 9.4 | 0.10 | 0.940 | 5.8 | 25.2 | 26.6 | 115.4 | 23.5 | 26.8 | 90.1% | No lithium plating | 90.2% | 8.4% |
| Embodiment 33 | 9.4 | 0.10 | 0.940 | 5.8 | 25.2 | 26.6 | 115.4 | 32.5 | 38.0 | 92.3% | No lithium plating | 91.9% | 8.3% |
| Embodiment 34 | 9.4 | 0.10 | 0.940 | 5.8 | 25.2 | 26.6 | 115.4 | 25.5 | 38.0 | 92.1% | No lithium plating | 92.3% | 8.1% |
| Embodiment 35 | 9.4 | 0.10 | 0.940 | 5.8 | 25.2 | 26.6 | 115.4 | 18.0 | 21.0 | 92.3% | Slight lithium plating | 92.3% | 8.9% |

TABLE 1-continued

| | Gr/K | K | Gr | Lc/S | La/S | Lc | La | Dv90 | Dv90/ Dv10 + Dv90 | First-cycle coulombic efficiency | Lithium plating phenomenon | Cycle capacity retention rate | Cycle expansion rate |
|---|---|---|---|---|---|---|---|---|---|---|---|---|---|
| Embodiment 36 | 9.4 | 0.10 | 0.940 | 13.0 | 18.5 | 65.0 | 92.5 | 18.0 | 21.0 | 90.0% | Slight lithium plating | 90.2% | 9.6% |
| Comparative Embodiment 1 | 5.1 | 0.18 | 0.910 | 5.8 | 25.2 | 26.6 | 115.4 | 28.5 | 38.0 | 86.0% | Lithium plating | 87.5% | 10.0% |
| Comparative Embodiment 2 | 18.0 | 0.05 | 0.970 | 5.8 | 25.2 | 26.6 | 115.4 | 28.5 | 38.0 | 89.0% | Severe lithium | 86.0% | 11.8% |

TABLE 2

| | Areal density $(mg/mm^2)$ | S' | Compacted density $(g/cm^3)$ | Peel-off strength (N/m) | Porosity | Thermal decomposition temperature (° C.) Fully discharged | Fully charged | First-cycle coulombic efficiency | Cycle capacity retention rate (45° C.) | Cycle expansion rate (45° C.) |
|---|---|---|---|---|---|---|---|---|---|---|
| Embodiment 37 | 0.090 | 11.2 | 1.72 | 7.5 | 31.0% | 132 | 305 | 93.2% | 92.1% | 8.0% |
| Embodiment 38 | 0.090 | 12.3 | 1.77 | 9.0 | 28.0% | 135 | 311 | 93.0% | 91.4% | 8.1% |
| Embodiment 39 | 0.090 | 14.1 | 1.83 | 10.8 | 25.0% | 140 | 321 | 92.7% | 90.7% | 8.3% |
| Embodiment 40 | 0.100 | 12.5 | 1.72 | 8.5 | 33.2% | 135 | 313 | 93.2% | 92.3% | 8.1% |
| Embodiment 5 | 0.100 | 14.0 | 1.77 | 10.3 | 30.0% | 136 | 316 | 93.4% | 92.5% | 8.2% |
| Embodiment 41 | 0.100 | 15.6 | 1.83 | 12.2 | 26.8% | 139 | 317 | 93.0% | 92.0% | 8.5% |
| Embodiment 42 | 0.118 | 13.8 | 1.72 | 9.5 | 35.6% | 143 | 331 | 93.1% | 91.8% | 8.2% |
| Embodiment 43 | 0.118 | 15.5 | 1.77 | 11.3 | 32.1% | 145 | 334 | 93.0% | 91.4% | 8.4% |
| Embodiment 44 | 0.118 | 17.9 | 1.83 | 13.9 | 29.3% | 148 | 338 | 92.9% | 91.0% | 8.7% |

What is claimed is:

1. A negative active material, comprising: a carbon material; and $6.1 < Gr/K \leq 15.3$, wherein, Gr is a graphitization degree of the carbon material, measured by means of X-ray diffraction; and K is a ratio Id/Ig of a peak intensity Id of the carbon material at a wavenumber of 1250 $cm^{-1}$ to 1650 $cm^{-1}$ to a peak intensity Ig of the carbon material at a wavenumber of 1500 $cm^{-1}$ to 1650 $cm^{-1}$, and is measured by using Raman spectroscopy, and K is 0.09 to 0.15;

wherein a Dv10 value and a Dv90 value of the negative active material in μm satisfy: $23.0 < Dv90/Dv10 + Dv90 \leq 50$;

wherein $4.3 \leq Lc/S < 13$, wherein

Lc is a size of a crystal of the carbon material along a vertical axis as measured by X-ray diffraction, and is measured in units of nm;

S is a ratio of a peak area C004 of a (004) surface to a peak area C110 of a (110) surface of the negative active material as measured by using an X-ray diffraction pattern;

Lc is less than 45.

2. The negative active material according to claim 1, wherein Gr is 0.92 to 0.97.

3. The negative active material according to claim 1, wherein $La/S > 17$, wherein La is a size of a crystal of the carbon material along a horizontal axis as measured by X-ray diffraction, and is measured in units of nm; and La is greater than 50.

4. The negative active material according to claim 3, wherein $9 \leq Gr/K \leq 14$.

5. The negative active material according to claim 3, wherein $20 \leq Lc \leq 43$, and/or $80 \leq La \leq 180$.

6. The negative active material according to claim 3, wherein $4.3 \leq Lc/S \leq 12$.

7. The negative active material according to claim 3, wherein $22 \leq La/S \leq 40$.

8. An electrochemical device, comprising a positive electrode, an electrolytic solution, and a negative electrode; wherein the negative electrode comprises a negative active material layer and a negative current collector, and the negative active material layer comprises the negative active material;

wherein, the negative active material comprises a carbon material; and $6.1 < Gr/K \leq 15.3$, wherein, Gr is a graphitization degree of the carbon material, measured by X-ray diffraction; and K is a ratio Id/Ig of a peak intensity Id of the carbon material at a wavenumber of 1250 cm$^{-1}$ to 1650 cm$^{-1}$ to a peak intensity Ig of the carbon material at a wavenumber of 1500 cm$^{-1}$ to 1650 cm$^{-1}$, and is measured by using Raman spectroscopy, and K is 0.09 to 0.15;

wherein a Dv10 value and a Dv90 value of the negative active material in μm satisfy: 23.0<Dv90/Dv10+Dv90≤50;

wherein 4.3≤Lc/S<13, wherein

Lc is a size of a crystal of the carbon material along a vertical axis as measured by X-ray diffraction, and is measured in units of nm;

S is a ratio of a peak area C004 of a (004) surface to a peak area C110 of a (110) surface of the negative active material as measured by using an X-ray diffraction pattern;

Lc is less than 45.

9. The electrochemical device according to claim 8, wherein Gr is 0.92 to 0.97.

10. The electrochemical device according to claim 8, wherein $$La/S>17,$$

wherein

La is a size of a crystal of the carbon material along a horizontal axis as measured by X-ray diffraction, and is measured in units of nm; and La is greater than 50.

11. The electrochemical device according to claim 8, wherein 7<Gr/K<14.

12. The electrochemical device according to claim 8, wherein 9<Gr/K<15.

13. The electrochemical device according to claim 8, wherein 23.0<Dv90/Dv10+Dv90<35.

14. The electrochemical device according to claim 10, wherein 4.3≤Lc/S≤12.

15. The electrochemical device according to claim 10, wherein 25≤La/S≤45.

16. The electrochemical device according to claim 8, wherein an areal density of the negative active material layer is 0.077 mg/mm$^2$ to 0.121 mg/mm$^2$, a compacted density of the negative active material layer is 1.70 g/cm$^3$ to 1.92 g/cm$^3$.

17. The electrochemical device according to claim 8, wherein the electrochemical device satisfies at least one of the following conditions:

(1) a peel-off strength between the negative active material layer and the negative current collector is 6 N/m to 15 N/m; or (2) a porosity of the negative active material layer is 20% to 40%.

18. The electrochemical device according to claim 8, wherein, in a fully charged state, the electrochemical device satisfies at least one of the following conditions:

(1) as measured by an X-ray diffraction pattern, a ratio S' of a peak area C004' of a (004) surface to a peak area C110' of a (110) surface of the negative active material layer is 10 to 20; or (2) a thermal decomposition temperature of the negative active material layer is greater than or equal to 280° C.

19. The electrochemical device according to claim 8, wherein, in a fully discharged state of the electrochemical device, a thermal decomposition temperature of the negative active material layer is greater than or equal to 130° C.

20. An electronic device, comprising the electrochemical device; the electrochemical device comprising a positive electrode, an electrolytic solution, and a negative electrode, wherein the negative electrode comprises a negative active material layer and a negative current collector, and the negative active material layer comprises the negative active material;

wherein, the negative active material comprises a carbon material; and 6<Gr/K<16, wherein, Gr is a graphitization degree of the carbon material, measured by X-ray diffraction; and K is a ratio Id/Ig of a peak intensity Id of the carbon material at a wavenumber of 1250 cm−1 to 1650 cm−1 to a peak intensity Ig of the carbon material at a wavenumber of 1500 cm-1 to 1650 cm−1, and is measured by using Raman spectroscopy, and K is 0.09 to 0.15;

wherein a compacted density of the negative active material layer is 1.70 g/cm$^3$ to 1.92 g/cm$^3$;

wherein 4.3≤Lc/S<13, wherein

Lc is a size of a crystal of the carbon material along a vertical axis as measured by X-ray diffraction, and is measured in units of nm;

S is a ratio of a peak area C004 of a (004) surface to a peak area C110 of a (110) surface of the negative active material as measured by using an X-ray diffraction pattern;

Lc is less than 45.

\* \* \* \* \*